United States Patent
Kobori (10) Patent No.: US 7,213,559 B2
(45) Date of Patent: May 8, 2007

(54) INTAKE AIR DEVICE FOR INTERNAL COMBUSTION ENGINE

(75) Inventor: Yoichi Kobori, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/320,618

(22) Filed: Dec. 30, 2005

(65) Prior Publication Data

US 2006/0150939 A1    Jul. 13, 2006

(30) Foreign Application Priority Data

Jan. 7, 2005    (JP)    ............... 2005-003166

(51) Int. Cl.
F02M 35/10    (2006.01)
(52) U.S. Cl. .................................. 123/184.55
(58) Field of Classification Search ........... 123/184.53, 123/184.55
See application file for complete search history.

(56) References Cited

U.S. PATENT DOCUMENTS 4,862,840 A    9/1989    Matsunaga et al.

FOREIGN PATENT DOCUMENTS

| DE | 86 27 201 U1 | 11/1998 |
|---|---|---|
| EP | 0 382 596 A | 8/1990 |
| EP | 0 511 209 A | 7/1993 |
| JP | B2 3395009 | 3/1993 |
| JP | A 2001-509562 | 1/1999 |
| JP | A 2001-82155 | 3/2001 |

*Primary Examiner*—Noah P. Kamen
(74) *Attorney, Agent, or Firm*—Kenyon & Kenyon LLP

(57) ABSTRACT

An intake air device includes a first intake passage the length of which is fixed; a second intake passage the length of which can be changed, and a downstream-end of which is joined to a downstream-portion of the first intake passage; a first valve the opening degree of which can be changed, and which is provided in the first intake passage; a second valve the opening degree of which can be changed, and which is provided in the second intake passage; and operation means for operating the first valve and the second valve according to the operating state of the internal combustion engine. With this configuration, the cross sectional area perpendicular to the longitudinal direction of at least one intake passage that is used can be appropriately changed according to the operating state of the internal combustion engine.

11 Claims, 8 Drawing Sheets

INTAKE AIR DEVICE FOR INTERNAL COMBUSTION ENGINE

INCORPORATION BY REFERENCE

The disclosure of Japanese Patent Application No. 2005-003166 filed on Jan. 7, 2005 including the specification, drawings and abstract is incorporated herein by reference in its entirety.

BACKGROUND OF THE INVENTION

1. Field of the Invention

The invention relates to an intake air device provided for an internal combustion engine.

2. Description of the Related Art

In internal combustion engines, an intake air device is provided to supply air-fuel mixture to a combustion chamber. This intake air device includes intake passages that connect a surge tank to intake ports in a cylinder-head. The intake passages are provided for respective intake ports (i.e., respective cylinders).

Japanese Patent Application Publication No. JP-A-2001-82155 describes an intake air device where the length of each intake passage varies among predetermined values. Japanese Patent Application Publication No. JP-A-2001-509562 describes an intake air device where the length of each intake passage can be continuously changed.

In internal combustion engines, when the intake valve of each cylinder is opened to introduce air-fuel mixture into the combustion chamber during the intake stroke, pulsating intake air passes through the intake passage. Because the intake air is pulsating in the intake passage, high-density air and low-density air are alternately present in the flow of the intake air. The cycle of the pulsation of the intake air varies depending on the shape, length, cross sectional area, and the like of the intake passage. Meanwhile, the time point where the intake valve is opened and the time point where the intake valve is closed vary depending on the engine speed.

If high-density air reaches the combustion chamber in the last stage of the intake stroke, the intake air continues to flow into the combustion chamber due to inertia even after a piston passes a bottom dead center. This effect is referred to as "inertia supercharging effect". This improves the efficiency in filling the combustion chamber with intake air, and the output of the internal combustion engine.

In each of the aforementioned intake air devices where the length of each intake passage is variable, the length of each intake passage is changed according to the parameters indicating the operating state, such as the load and speed of the internal combustion engine. As a result, the aforementioned inertia supercharging effect can be obtained at all engine speeds. This improves the efficiency in filling the combustion chamber with intake air.

In each of the intake air devices, the maximum length and cross sectional area of each intake passage are fixed to respective predetermined values, and only the length of each intake passage can be changed. Therefore, the size of the intake air device needs to be increased to improve the efficiency in the filling the combustion chamber with intake air at all engine speeds, for the reason described below.

If the cross sectional area of each intake passage is reduced to optimize the amount of intake air supplied at low engine speed, an adequate amount of intake air cannot be supplied at high engine speeds. If the cross sectional area of each intake passage is increased to optimize the amount of air supplied at high engine speed, the maximum length of each intake passage needs to be maximized so that the appropriate amount of intake air is supplied at low engine speeds. Accordingly, the size of the component that constitutes each intake passage needs to be increased. Therefore, if the space in a vehicle is insufficient, the intake air device cannot be installed.

Japanese Patent Application Publication No. JP-A-3395009 describes an intake air device that includes two intake passages for each cylinder. In the intake air device, one of the intake passages is used at low engine speed, and the other intake passage is used at high engine speed.

This intake air device needs to be designed such that the length and cross sectional area of each of the two intake passages become appropriate at all engine speeds. This increases the size of the intake air device. As a result, if there is insufficient space in a vehicle, the intake air device cannot be installed.

SUMMARY OF THE INVENTION

It is an object of the invention to provide an intake air device for an internal combustion engine that can supply the appropriate amount of intake air according to the operating state of an internal combustion engine.

A first aspect of the invention relates to an intake air device for an internal combustion engine. The intake air device for an internal combustion engine supplies the air-fuel mixture to a combustion chamber of an internal combustion engine. The intake air device includes a fixed-length intake passage; a variable-length intake passage; a first valve; a second valve; and an operation device. A downstream-end of the variable-length intake passage is joined to a downstream-portion of the fixed-length intake passage. The first valve is provided in the fixed-length intake passage. The opening degree of the first valve can be adjusted. The second valve is provided in the variable-length intake passage. The opening degree of the second valve can also be adjusted. The operation device operates the first valve and the second valve according to the operating state of the internal combustion engine.

In the intake air device described above, for example, when the first valve is closed and the second valve is opened, only the variable-length intake passage can be used. When the first valve is opened and the second valve is closed, only the fixed-length intake passage can be used. When both of the first valve and the second valve are opened, both of the fixed-length intake passage and the variable-length intake passage can be used. That is, the mode where intake air flows can be switched among at least three modes according to the operating state of the internal combustion engine (for example, according to the engine speed). Accordingly, the intake air device having this configuration can supply the appropriate amount of intake air to the combustion chamber according to the operating state of the engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXAMPLE EMBODIMENTS

Hereinafter, an embodiment of the invention will be described with reference to FIG. 1 through FIG. 8. In this embodiment, the invention is applied to an internal combustion engine such as a four-cylinder gasoline engine for a vehicle. However, the invention can be applied to engines having any number of cylinders. Also, the invention can be applied to diesel engines.

Figure 1:
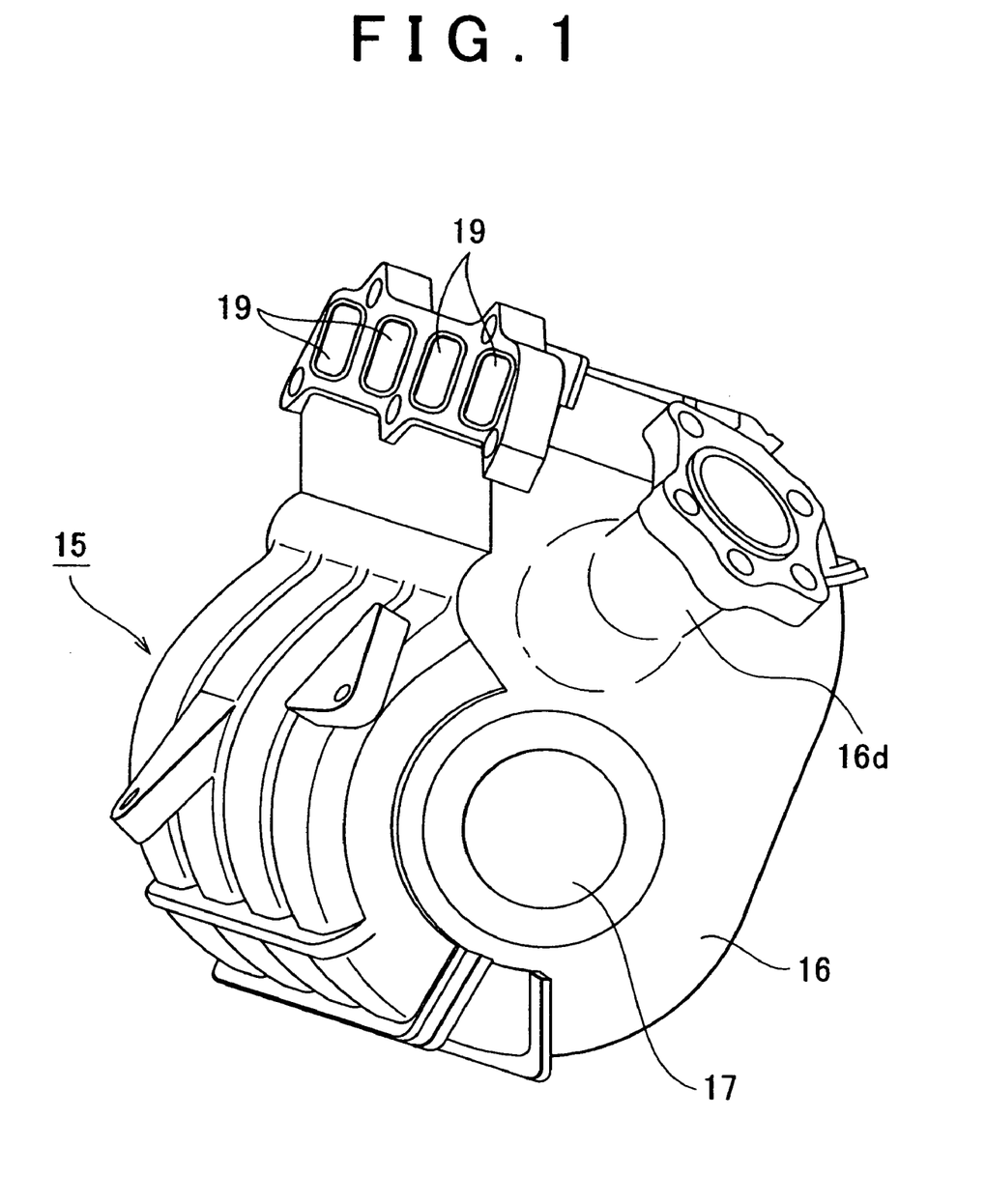
FIG. 1 illustrates an oblique perspective view of the outer appearance of an intake air device for an internal combustion engine according to an example embodiment of the invention.
Figure 2:
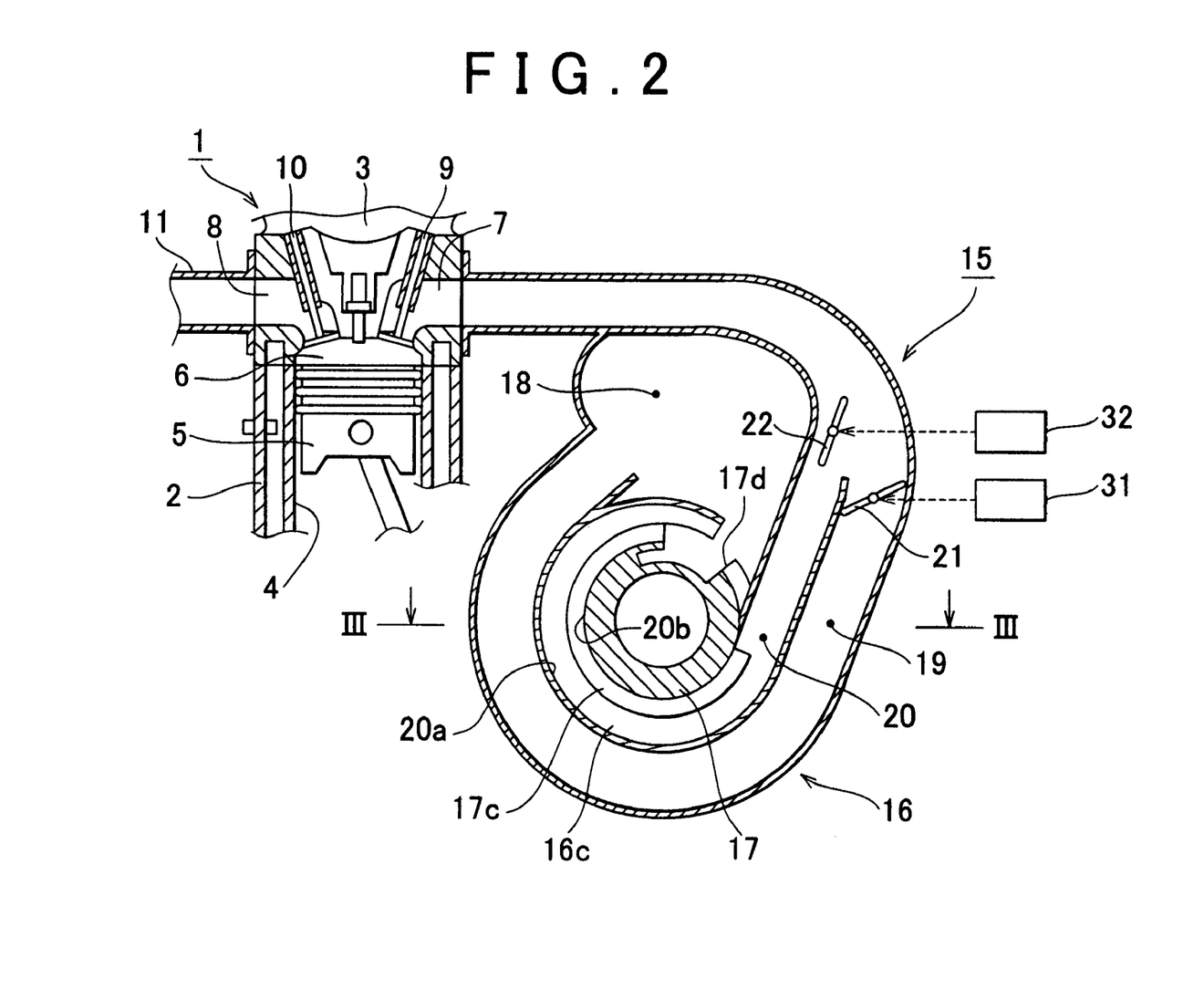
FIG. 2 illustrates a schematic cross sectional view of an internal combustion engine provided with the intake air device in FIG. 1.

As shown in FIG. 2, an engine 1 includes a cylinder-block 2 and a cylinder-head 3.

In the cylinder-block 2, a plurality of cylinders (in this case, four cylinders) 4 are provided. A piston 5 is inserted in each cylinder 4. The piston 5 can be reciprocated in each cylinder 4. A space between an upper end of the piston 5 and a cylinder-head 3 forms the combustion chamber 6 in each cylinder 4.

In the cylinder-head 3, an intake port 7 and an exhaust port 8 are provided for each combustion chamber 6. An intake valve 9 opens and closes an opening at one end of the intake port 7 (i.e., opening that opens into the combustion chamber 6). An exhaust valve 10 opens and closes an opening at one end of the exhaust port 8 (i.e., opening that opens into the combustion chamber 6).

An opening at the other end of the intake port 7 is connected to an intake air device 15. The intake air device 15 is connected to a throttle body (not shown) and an air cleaner (not shown). The throttle body is opened and closed through an intake pipe based on the operation of an accelerator pedal. Each exhaust port 8 is connected to an exhaust manifold 1.

The configuration of the intake air device 15 will be described in detail.

As shown in FIG. 1 through FIG. 4, the intake air device 15 includes a first member 16 and a second member 17. A surge tank 18 is a space having a predetermined capacity is provided between the first member 16 and the second member 17. Fixed-length intake passages 19 and variable-length intake passages 20 are provided in the intake air device 15. The number of fixed-length intake passages 19 is the same as that of intake ports 7 (i.e., four fixed-length intake passages 19 are provided). Also, the number of variable-length intake passages 20 is the same as that of intake ports 7 (i.e., four variable-length intake passages 20 are provided). Hereinafter, each of these elements will be described in detail.

The first member 16 is fixed to the cylinder-head 3. The first member 16 supports the rotatable second member 17.

Figure 3:
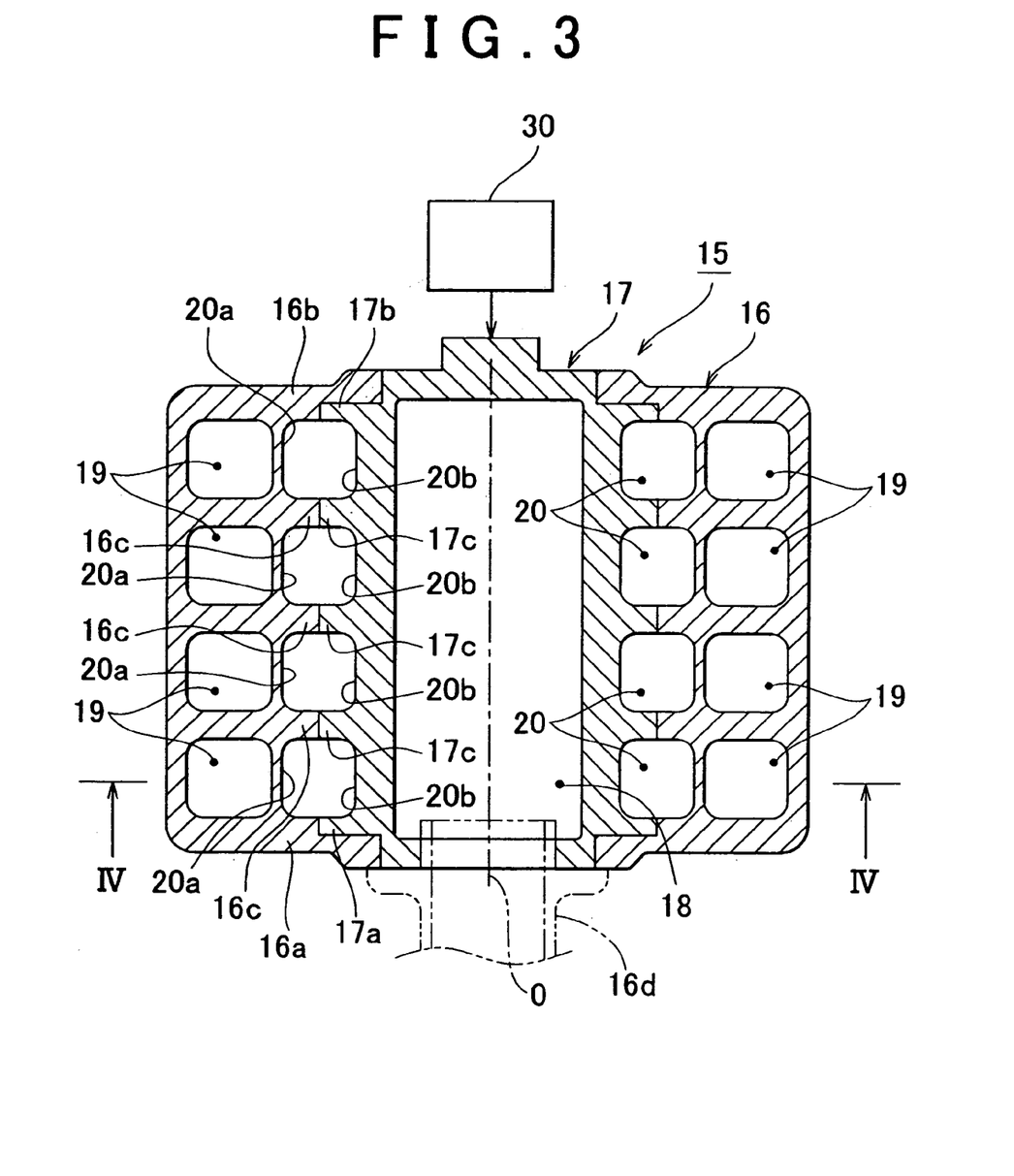
FIG. 3 illustrates a cross sectional view taken along line III—III in FIG. 2.

Each fixed-length intake passage 19 (indicated by dashed line Lx in FIG. 7) has a fixed, predetermined length. The cross sectional area of each fixed-length intake passage 19, as measured along the view in FIG. 3, is also fixed to a predetermined value. Fixed-length intake passages 19 extend through the first member 16 in the longitudinal direction. Also, the fixed-length intake passages 19 are arranged in the axial direction. A downstream-end of each fixed-length intake passage 19 is connected to the corresponding intake port 7 in the cylinder-head 3. An upstream-end of each fixed-length intake passage 19 is connected to the surge tank 18.

The length of each variable-length intake passage 20 (indicated by a dashed line Ly in FIG. 4) is variable. Each variable-length intake passage 20 is provided between the first member 16 and the second member 17. The configuration of the variable-length intake passage 20 will be described.

As shown in FIG. 3 through FIG. 6, an external wall 16a is provided at one end of the first member 16, and an external wall 16b is provided at the other end of the first member 16. Three partitions 16c are provided between the external walls 16a and 16b. Four grooves 20a are formed on the inner surface of the first member 16 by the external walls 16a and 16b and the three partitions 16c.

The external wall 16a is provided with a tubular air-inlet 16d. Outside air flows into the surge tank 18 through the air-inlet 16d. The air-inlet 16d is connected to the throttle body (not shown) and the air cleaner (not shown) via the intake pipe (not shown).

As shown in FIG. 3 through FIG. 6, an external wall 17a is provided at one end of the second member 17, and an external wall 17b is provided at the other end of the second member 17. Three partitions 17c are provided between the external walls 17a and 17b. Four grooves 20b are formed on the outer surface of the second member 17 by the external walls 17a and 17b and the three partitions 17c.

The variable-length intake passages 20 are formed by combining the four grooves 20a of the first member 16 with the four grooves 20b of the second member 17.

The length of each variable-length intake passage 20 can be continually changed by rotating the second member 17 around the central axis O using an actuator 30 such as a servo motor or a stepping motor.

Figure 5:
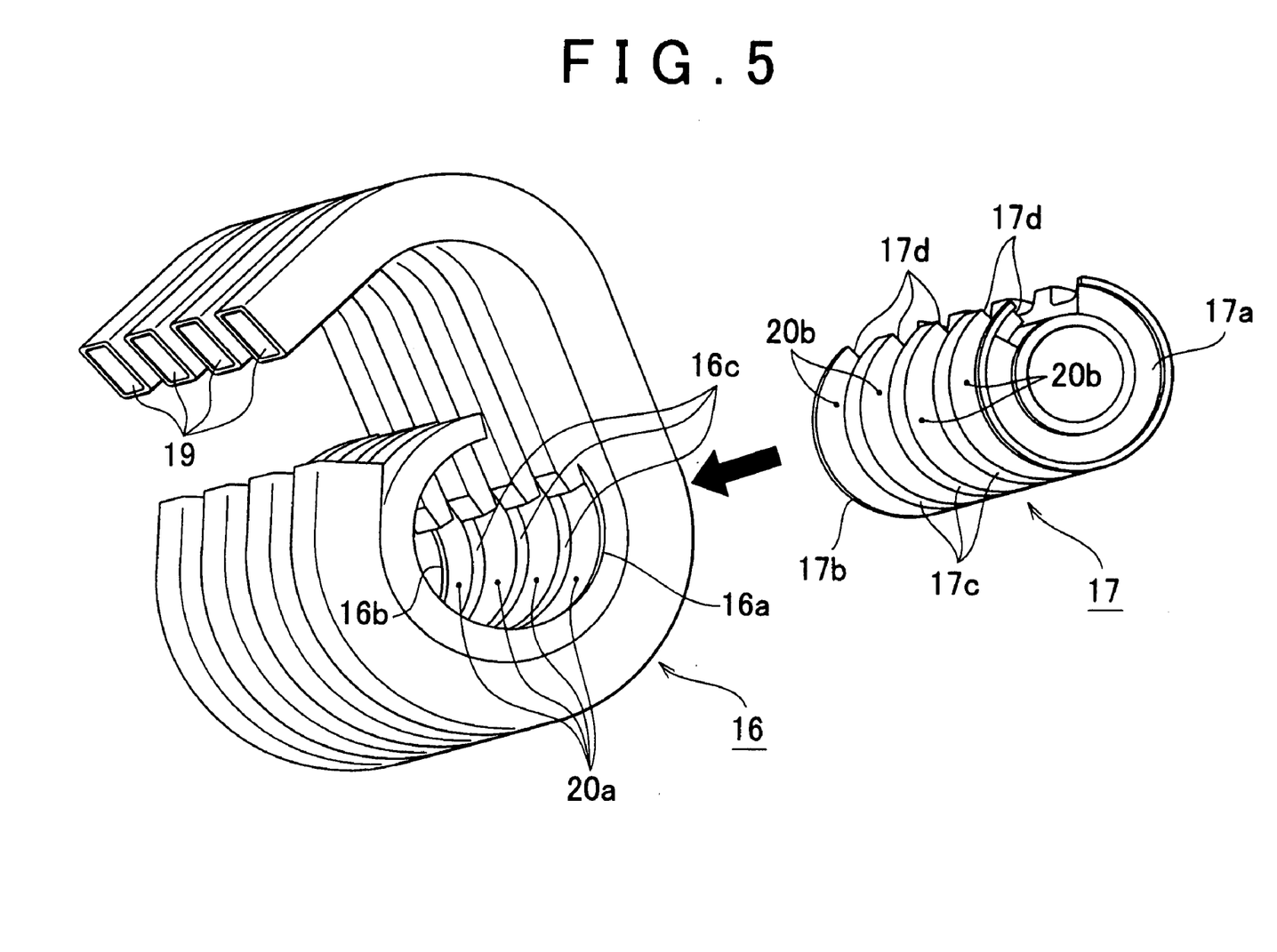
FIG. 5 illustrates a schematic exploded perspective view of the inside of the intake air device in FIG. 1.
Figure 6:
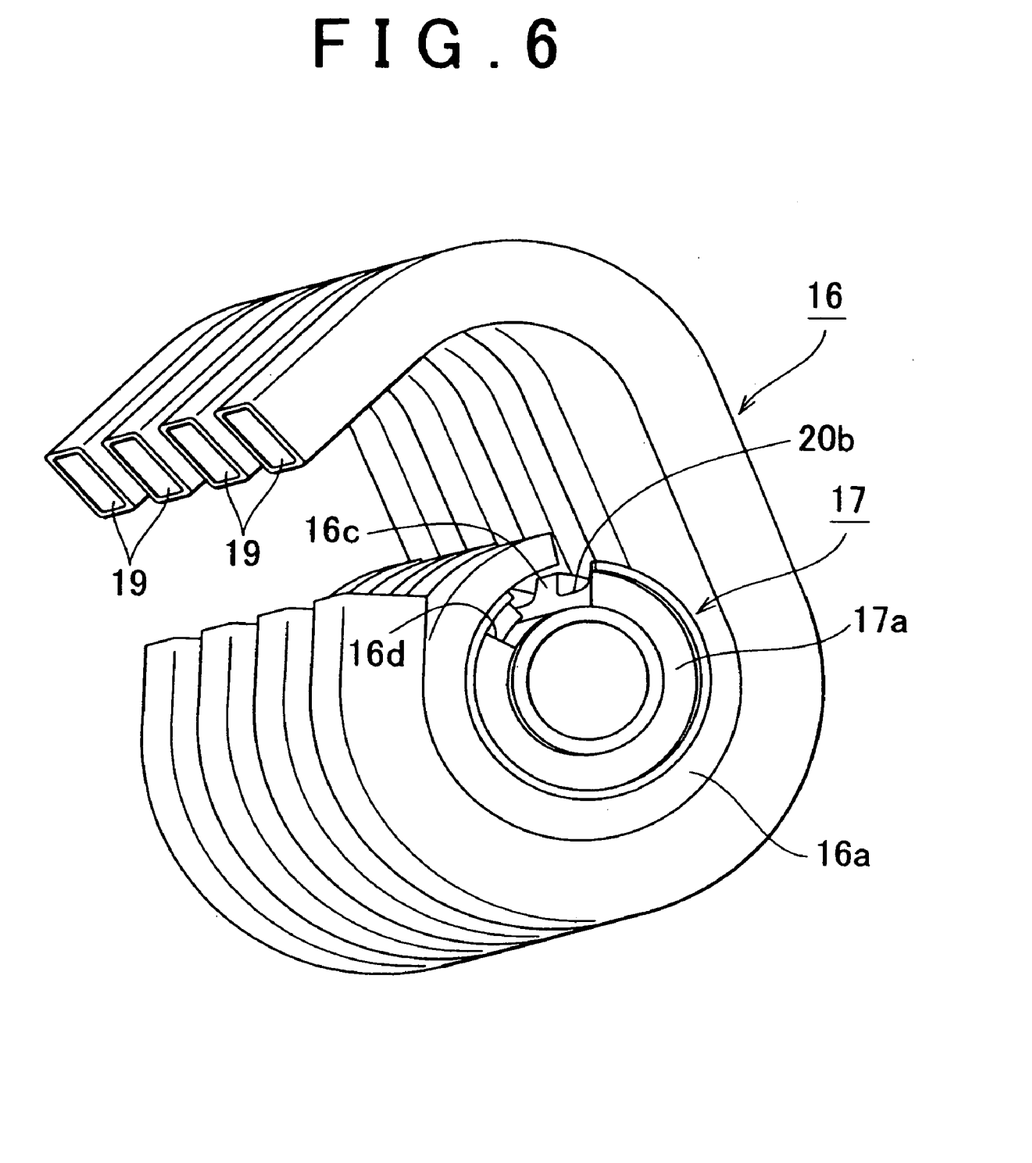
FIG. 6 illustrates an exploded perspective view of the intake air device in FIG. 5.

As shown in FIG. 5 and FIG. 6, a notch 17d is formed in each of the external walls 17a and 17b and the partitions 17c at a predetermined position in the circumferential direction. Air flows from the surge tank 18 into each variable-length intake passage 20 through the corresponding notch 17d.

That is, by rotating the second member 17 in a clockwise direction or in a counterclockwise direction, each notch 17d is rotated around the central axis O. This changes the length of each variable-length intake passage 20. For example, by rotating the second member 17 in the counterclockwise direction in FIG. 4, the length Ly of the variable-length intake passage 20 is reduced. By rotating the second member 17 in the clockwise direction, the length Ly of the variable-length intake passage 20 is increased.

The variable-length intake passage 20 is provided along the inner periphery of the fixed-length intake passage 19. A downstream-end of the variable-length intake passage 20 is joined to the bent portion of the fixed-length intake passage 19 at the downstream side thereof.

A first valve 21 is provided in the fixed-length intake passage 19 at a position immediately upstream of the location where the variable-length intake passage 20 is joined to the fixed-length intake passage 19. The first valve 21 opens and closes the fixed-length intake passage 19. A second valve 22 is provided in the variable-length intake passage 20 at the location where the variable-length intake passage 20 is joined to the fixed-length intake passage 19. The second valve 22 opens and closes the variable-length intake passage 20.

Each of the first valve 21 and the second valve 22 is supported at the inside of the first member 16. Each of the first valve 21 and the second valve 22 is pivoted around the center thereof. The first valve 21 and the second valve 22 are opened and closed by the respective actuators 31 and 32, such as servo motors or stepping motors, according to the parameters indicating the operating state of the engine 1, such as the load and the speed of the engine 1. For example, the load on the engine 1 is determined based on the operation amount of an accelerator pedal or the like.

Next, the operation of the engine 1 provided with the intake air device 15 will be described.

In this embodiment, the length Lx of the fixed-length intake passage 19 is longer than the maximum length Ly of the variable-length intake passage 20. Also, the cross sectional area of the fixed-length intake passage 19 is greater than that of the variable-length intake passage 20. Hereinafter, the relation between the operating state of the engine 1 and the intake passages having the aforementioned configurations will be described.

Figure 4:
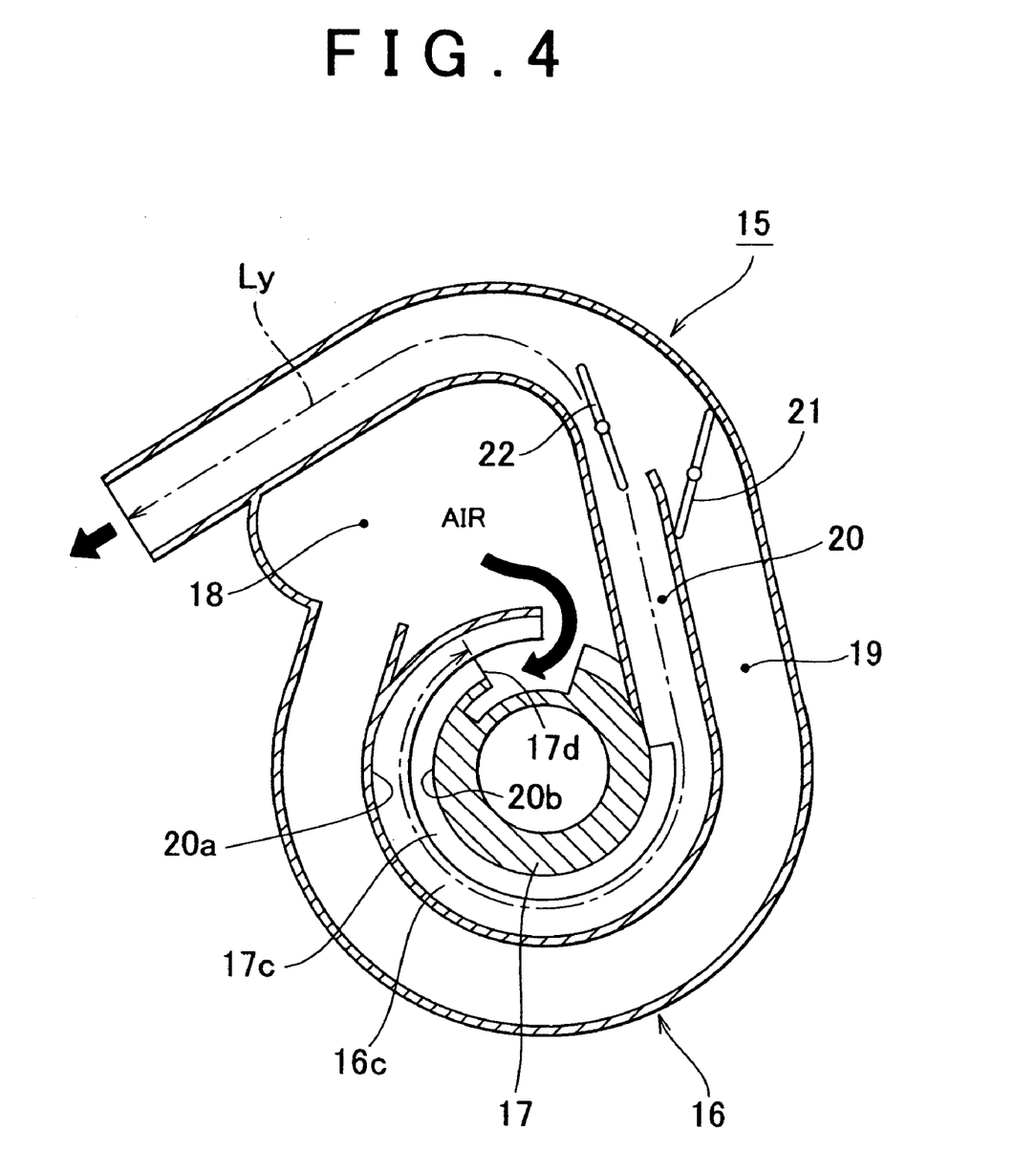
FIG. 4 illustrates a cross sectional view taken along line IV—IV in FIG. 3, of the intake air device where only a variable-length intake passage is used in a first mode.

When the engine speed is low, the intake air device 15 operates in a first mode. In the first mode, the first valve 21 is closed and the second valve 22 is opened so that only the variable-length intake passage 20 is used, as shown in FIG. 4. In the first mode, outside air flows into the surge tank 18 in the intake device 15 through the air cleaner (not shown) and the intake pipe (not shown). Then, the pulsating air flows in the variable-length intake passage 20, and flows into the combustion chamber 6 through the intake port 7 in the cylinder-head 3.

In the first mode, the cross sectional area of the intake passage is small, because only the variable-length intake passage 20 is used. The maximum length and the cross sectional area of the variable-length intake passage 20 are set to respective predetermined values. By setting the maximum length and the cross sectional area of the variable-length intake passage 20 to the respective predetermined values, the appropriate amount of air can be supplied at low engine speed.

In the first mode, the length of the variable-length intake passage 20 can be changed by rotating the second member 17 by an appropriate angle in an appropriate direction, according to the fluctuation in the engine speed. For example, when the engine speed increases, the length Ly of the variable-length passage 20 is reduced by rotating the second member 17 in the counterclockwise direction in FIG. 4. When the engine speed decreases, the length Ly of the variable-length intake passage 20 is increased by rotating the second member 17 in the clockwise direction in FIG. 4. By changing the length Ly of the variable-length intake passage 20 in this manner, the appropriate amount of intake air can be supplied according to the fluctuation in the low engine speed.

Figure 7:
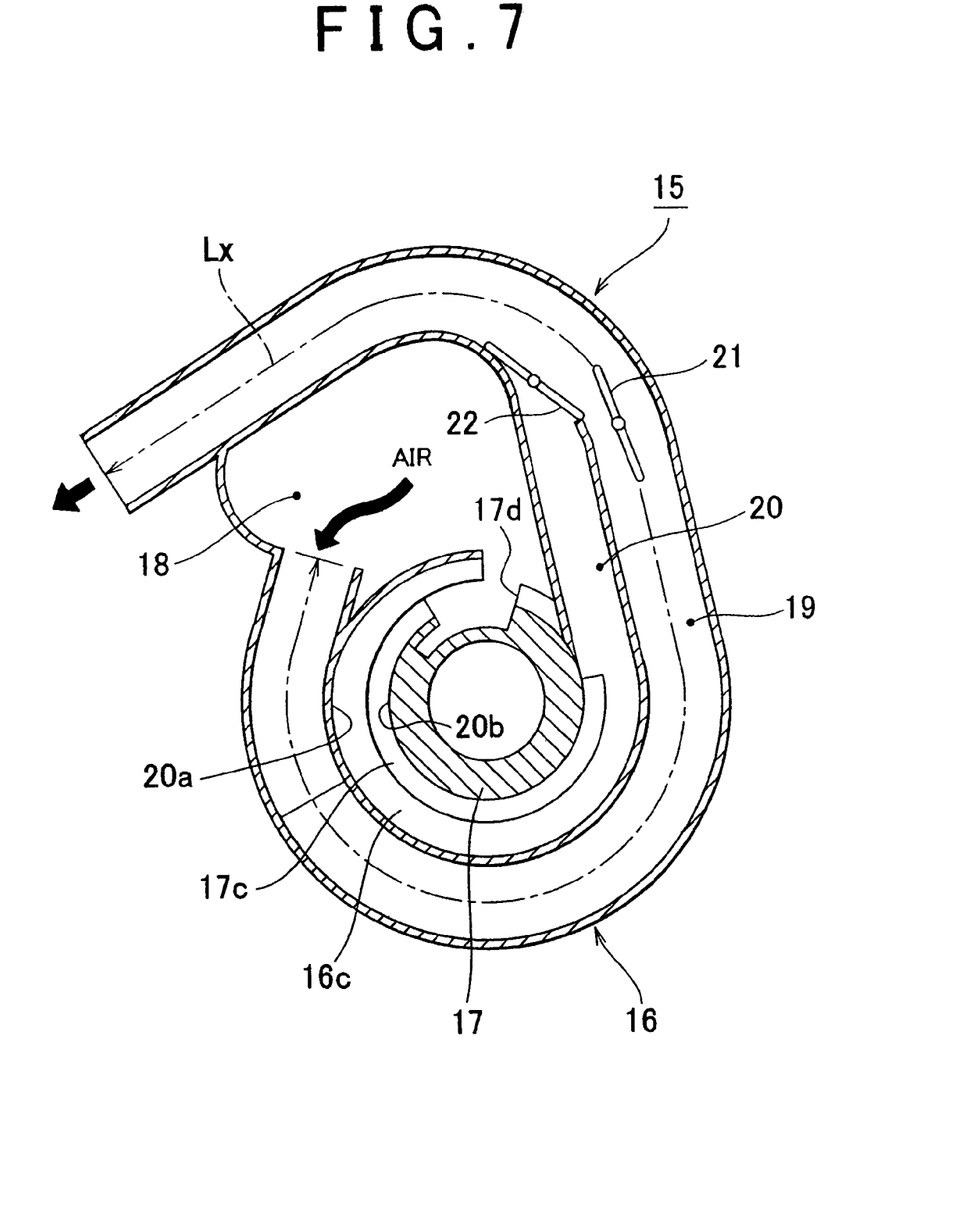
FIG. 7 illustrates a cross sectional view taken along line IV—IV in FIG. 3, of the intake air device where only a fixed-length intake passage is used in a second mode.

At intermediate engine speeds, the intake air device 15 operates in a second mode. In the second mode, the first valve 21 is opened and the second valve 22 is closed so that only the fixed-length intake passage 19 is used, as shown in FIG. 7. In this mode, outside air flows into the surge tank 18 in the intake air device 15 through the air cleaner (not shown) and the intake pipe (not shown). Then, the pulsating air flows only in the fixed-length intake passage 19, and flows into combustion chamber 6 through the intake port 7 in the cylinder-head 3.

In the second mode, the cross sectional area of the intake passage is greater than that in the first mode, because the fixed-length intake passage 19 is used. Each of the maximum length and the cross sectional area of the fixed-length intake passage 19 are set to respective predetermined values. By setting the maximum length and the cross sectional area of the variable-length intake passage 19 to the respective predetermined values, the appropriate amount of air can be supplied at intermediate engine speed.

Figure 8:
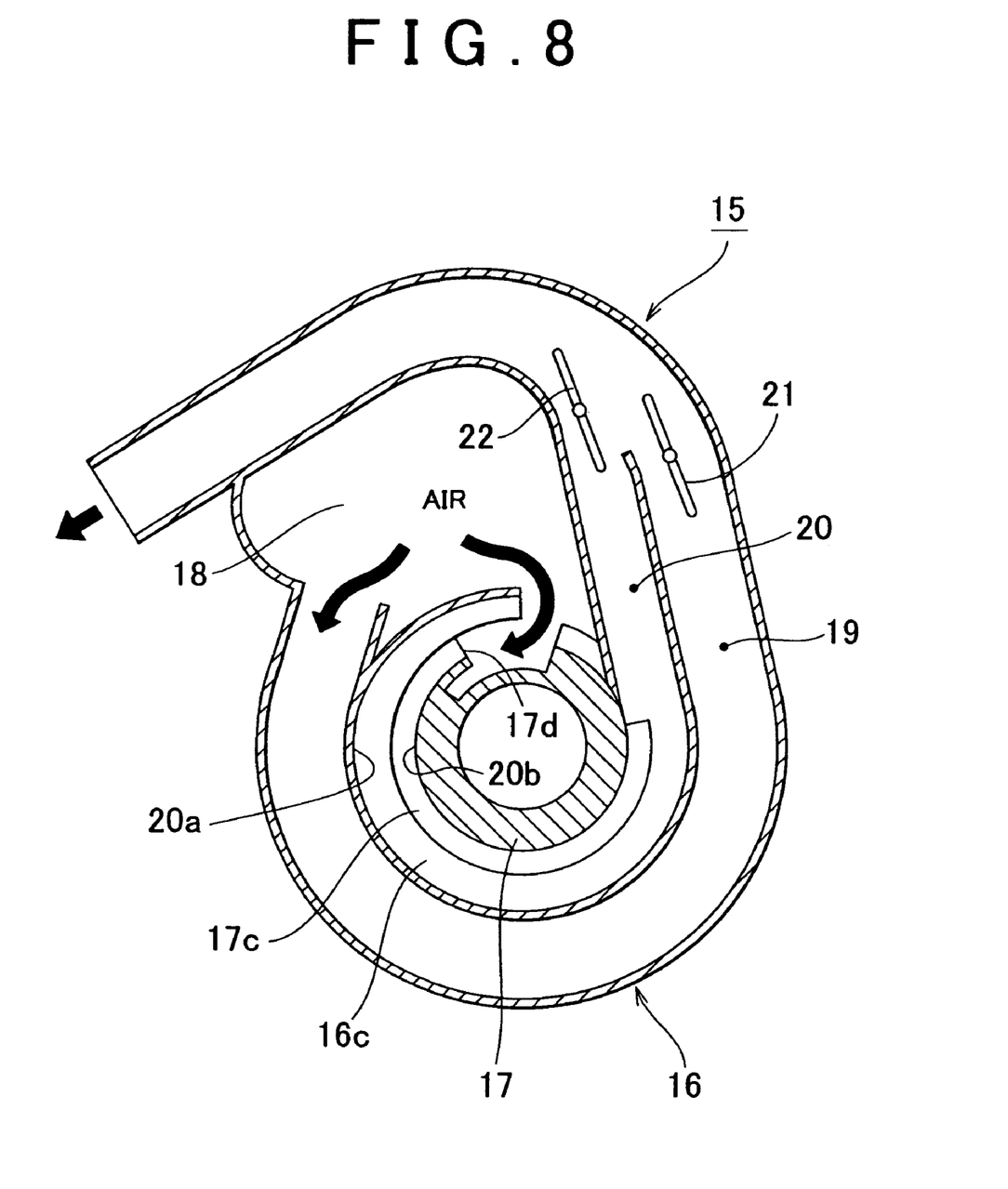
FIG. 8 illustrates a cross sectional view taken along line IV—IV in FIG. 3, of the intake air device where both the fixed-length intake passage and the variable-length intake passage are used in a third mode.

When the engine speed is high, the intake air device 15 operates in a third mode. In the third mode, both of the first valve 21 and the second valve 22 are opened so that both of the fixed-length intake passage 19 and the variable-length intake passage 20 are used, as shown in FIG. 8. In the third mode, outside air flows into the surge tank 18 in the intake air device 15 through the air cleaner (not shown) and the intake pipe (not shown). Then, the pulsating air flows in both of the fixed-length intake passage 19 and the variable-length intake passage 20, and flows into the combustion chamber 6 through the intake port 7 in the cylinder-head 3.

In the third mode, both of the fixed-length intake passage 19 and the variable-length intake passage 20 are used as described above. Therefore, the cross sectional area through which intake air flows in the third mode is greater than the cross sectional area through which intake air flows in each of the first mode and the second mode.

In the third mode, the length of the variable-length intake passage 20 can be changed by rotating the second member 17 by an appropriate angle in an appropriate direction according to the fluctuation in the engine speed. For example, when the engine speed increases, the length Ly of the variable-length intake passage 20 is reduced by rotating the second member 17 in the counterclockwise direction in FIG. 8. When the engine speed decreases, the length Ly of the variable-length intake passage 20 is increased by rotating the second member 17 in the clockwise direction in FIG. 8. By changing the length Ly of the variable-length intake passage 20 in this manner, the appropriate amount of intake air can be supplied according to the fluctuation in the high engine speed.

The intake air device 15 may be controlled by an engine electronic control unit (not shown; hereinafter, referred to as "engine ECU"). In this case, the engine ECU detects the operating state of the engine 1 based on the engine speed and the amount of intake air. On the basis of the detected operating state of the engine 1, the engine ECU selects the mode from among the first mode shown in FIG. 4, the second mode shown in FIG. 7, and the third mode shown in FIG. 8 by opening or closing the first valve 21 and the second valve 22 using the actuators 31 and 32. Also, the engine ECU changes the length of the variable-length intake passage 20 in the first mode and in the third mode by rotating the second member 17 using the actuator 30.

The engine speed is detected by a speed sensor such as a crank angle sensor or a cam angle sensor (not shown). The amount of intake air is detected using an air flow meter provided in the intake pipe, an intake air pressure sensor that detects the pressure inside the intake system (i.e., intake air pressure), a throttle sensor that detects the opening amount of a throttle valve, or the like (not shown).

The length of the variable-length intake passage 20 is controlled by calculating a target length based on the operating state of the engine 1, and rotating the second member 17 so that the actual length becomes equal to the target length. In addition, the length of the variable-length intake passage 20 can be controlled in the feedback manner, based on whether the difference between the actual length and the target length is in a permissible range. In this case, the actual length is calculated based on the rotational phase of the second member 17. A rotational phase sensor (not shown) detects the rotational phase (angle) of the second member 17 with respect to a predetermined reference position. The rotational phase sensor is fitted to the first member 16.

As described above, according to the embodiment, the cross sectional area of at least one of the intake passages can be appropriately changed depending on the engine speed. Therefore, the efficiency in filling the combustion chamber with intake air can be improved at all engine speeds.

Also, the length of the variable-length intake passage 20 can be changed at low engine speed and at high engine speed, using the length Lx of the fixed-length intake passage 19 as the reference length. Therefore, the length of the variable-length intake passage 20 can be appropriately adjusted at all engine speeds. Also, the cycle of the pulsation of intake air can be changed based on the time point where the intake valve 9 is opened and the time point where the intake valve 9 is closed.

With the intake air device 15 according to the embodiment, the aforementioned effects can be obtained, which improves the output of the engine 1.

Hereinafter, other embodiments of the invention will be described.

(1) In the aforementioned embodiment, the cross sectional area of the fixed-length intake passage 19 may be equal to or less than that of the variable-length intake passage 20, while the length Lx of the fixed-length intake passage 19 is longer than the maximum length Ly of the variable-length intake passage 20. In this case, preferably, the second mode is selected at low engine speed, the first mode is selected at intermediate engine speed, and the third mode is selected at high engine speed, using the actuators 31 and 32. That is, the length of the variable-length intake passage 20 can be changed at intermediate engine speed and at high engine speed, using the length Lx of the fixed-length intake passage 19 as the reference length.

(2) Although not shown, the intake air device 15 may include tubular fixed-length intake passages 19 that are independent of each other, and tubular variable-length intake passages 20 that are independent of each other. The number of the tubular fixed-length intake passages 19 is the same as the number of cylinders. Also, the number of the tubular variable-length intake passages 20 is the same as the number of cylinders. The tubular fixed-length intake passages 19 and the tubular variable-length intake passages 20 are integrally combined. In this case, although not shown, the variable-length intake passage having a substantially rectangular cross section or a substantially circular cross section is formed, for example, by combining an outer half-tube having a groove on the inner surface thereof with an inner half-tube having a groove on the outer surface thereof. The outer half-tube is fixed to the tubular fixed-length intake passage 19. The rotatable inner half-tube is supported by the tubular fixed-length intake passage 19.

What is claimed is:

1. An intake air device for an internal combustion engine, which supplies air-fuel mixture to a combustion chamber of an internal combustion engine, comprising:
    a fixed-length intake passage;
    a variable-length intake passage, wherein a downstream-end of the variable-length intake passage is joined to a downstream-portion of the fixed-length intake passage;
    a first valve, in which the opening degree can be adjusted, is provided in the fixed-length intake passage;
    a second valve, in which the opening degree can be adjusted, is provided in the variable-length intake passage; and
    an operation device that operates the first valve and the second valve according to the operating state of the internal combustion engine.

2. The intake air device for an internal combustion engine according to claim 1, wherein the length of the fixed-length intake passage is longer than the maximum length of the variable-length intake passage, and the cross sectional area of the fixed-length intake passage is greater than the cross sectional area of the variable-length intake passage.

3. The intake air device for an internal combustion engine according to claim 1, wherein the operating state of the internal combustion engine is determined based on the speed and the load of the internal combustion engine.

4. The intake air device for an internal combustion engine according to claim 3, wherein the operation device closes the first valve and opens the second valve so that only the variable-length intake passage is used during low-speed operation of the engine; the operation device closes the second valve and opens the first valve so that only the fixed-length intake passage is used during intermediate-speed operation of the engine; and the operation device opens both of the first valve and the second valve so that both of the fixed-length intake passage and the variable-length intake passage are used during high-speed operation of the engine.

5. The intake air device for an internal combustion engine according to claim 1, further comprising:
    a second operation device that changes the length of the variable-length intake passage.

6. The intake air device for an internal combustion engine according to claim 5, wherein:
    the variable-length intake passage comprises a first member having a groove on the inner surface thereof and a second member having a groove on the outer surface thereof, wherein the variable-length intake passage is formed by combining the first member with the second member so that the groove on the inner surface of the first member faces the groove on the outer surface of the second member; and
    the second operation device operates the second member to continuously change the length of the variable-length intake passage.

7. The intake air device for an internal combustion engine according to claim 6, wherein the fixed-length intake passage is formed in the first member.

8. The intake air device for an internal combustion engine according to claim 1, wherein the cross sectional area through which intake air flows can be switched among three values depending on the speed of the internal combustion engine, using the first valve and the second valve.

9. The intake air device for an internal combustion engine according to claim 8, wherein as the speed of the internal combustion engine increases, the cross sectional area through which intake air flows is increased.

10. The intake air device for an internal combustion engine according to claim 1, wherein the first valve is provided near the downstream-portion of the fixed-length intake passage.

11. The intake air device for an internal combustion engine according to claim 1, wherein the second valve is provided near the downstream-end of the variable-length intake passage.

* * * * *